United States Patent
Hatfield et al.

(10) Patent No.: US 11,994,348 B2
(45) Date of Patent: May 28, 2024

(54) HEATING AND COOLING SYSTEMS AND APPARATUSES WITH PHASE CHANGE MATERIALS

(71) Applicant: STASH ENERGY INC., Fredericton (CA)

(72) Inventors: Erik Hatfield, Fredericton (CA); Daniel Larsen, Fredericton (CA); Hannah Mallalieu, Fredericton (CA); Jordan Kennie, Fredericton (CA)

(73) Assignee: STASH ENERGY INC., Moncton (CA)

( * ) Notice: Subject to any disclaimer, the term of this patent is extended or adjusted under 35 U.S.C. 154(b) by 228 days.

(21) Appl. No.: 17/601,047

(22) PCT Filed: Mar. 13, 2020

(86) PCT No.: PCT/CA2020/050337
§ 371 (c)(1),
(2) Date: Oct. 1, 2021

(87) PCT Pub. No.: WO2020/198846
PCT Pub. Date: Oct. 8, 2020

(65) Prior Publication Data
US 2022/0205727 A1    Jun. 30, 2022

Related U.S. Application Data

(60) Provisional application No. 62/829,381, filed on Apr. 4, 2019.

(51) Int. Cl.
*F28D 7/00*    (2006.01)
*F24D 11/00*    (2022.01)
(Continued)

(52) U.S. Cl.
CPC .......... *F28D 7/0083* (2013.01); *F24D 11/001* (2013.01); *F24F 5/0021* (2013.01);
(Continued)

(58) Field of Classification Search
CPC .... F28D 7/0083; F28D 20/021; F24D 11/001; F24F 5/0021; F28F 1/12; F28F 2235/00; F28F 2250/08; F28F 2260/02
(Continued)

(56) References Cited

U.S. PATENT DOCUMENTS 4,513,053 A     4/1985  Chen
5,355,688 A  * 10/1994  Rafalovich ......... F24D 11/0214
                                                       62/430
(Continued)

FOREIGN PATENT DOCUMENTS

EP     3382292 A1    10/2018
WO    2007042621     4/2007
WO    2013058953     4/2013

OTHER PUBLICATIONS

Pakalka et al.: "Analysis of possibilities to use Phase Change Materials in Heat Exchangers-Accumulators", Environmental Engineering 10th International Conference, Apr. 27, 2017.
(Continued)

*Primary Examiner* — Claire E Rojohn, III
(74) *Attorney, Agent, or Firm* — Eugene Derenyi

(57) ABSTRACT

A system for selectively heating and cooling including a three-way heat exchange apparatus, a source apparatus for selectively heating and cooling a source fluid, a phase change material for selectively storing heating and cooling potential, and a distribution apparatus for selectively distributing heating and cooling a distribution fluid, wherein the three-way heat exchange apparatus is connected to the
(Continued)

serpentine microchannel apparatus for 3-way heat exchange phase change material by an interface between the heat exchange apparatus and the phase change material.

13 Claims, 19 Drawing Sheets

(51) Int. Cl.
  *F24F 5/00* (2006.01)
  *F28D 20/02* (2006.01)
  *F28F 1/12* (2006.01)
(52) U.S. Cl.
  CPC .............. *F28D 20/021* (2013.01); *F28F 1/12* (2013.01); *F28F 2235/00* (2013.01); *F28F 2250/08* (2013.01); *F28F 2260/02* (2013.01)
(58) Field of Classification Search
  USPC ..................................................... 165/104.17
  See application file for complete search history.

(56) References Cited

U.S. PATENT DOCUMENTS

| | | | | |
|---|---|---|---|---|
| 5,449,571 A | * | 9/1995 | Longardner | H01M 50/105 |
| | | | | 429/177 |
| 5,817,434 A | * | 10/1998 | Brooker | H01M 50/24 |
| | | | | 429/49 |
| 6,889,751 B1 | * | 5/2005 | Lukas | F28D 20/02 |
| | | | | 165/902 |
| 8,091,613 B2 | * | 1/2012 | Bank | F28D 9/0031 |
| | | | | 165/4 |
| 8,122,943 B2 | * | 2/2012 | Haller | F28D 1/0535 |
| | | | | 165/902 |
| 8,201,615 B2 | * | 6/2012 | Soukhojak | C09K 5/063 |
| | | | | 165/10 |
| 9,151,545 B2 | * | 10/2015 | Soukhojak | F28D 15/0266 |
| 9,709,337 B2 | * | 7/2017 | Pilebro | F28D 20/0034 |
| 9,719,688 B2 | * | 8/2017 | Holloway | F24F 5/0035 |
| 10,281,079 B2 | * | 5/2019 | Zheng | F16L 59/14 |
| 2003/0131623 A1 | | 7/2003 | Suppes | |
| 2013/0105126 A1 | | 5/2013 | Goenka | |
| 2018/0031333 A1 | | 2/2018 | Altman | |
| 2023/0221081 A1 | * | 7/2023 | Vesin | F28F 13/003 |
| | | | | 165/10 |

OTHER PUBLICATIONS

"NASA to Begin Testing Next Generation of Spacecraft Heat Exchangers", Jul. 21, 2016, [accessed online Jan. 24, 2024].

* cited by examiner

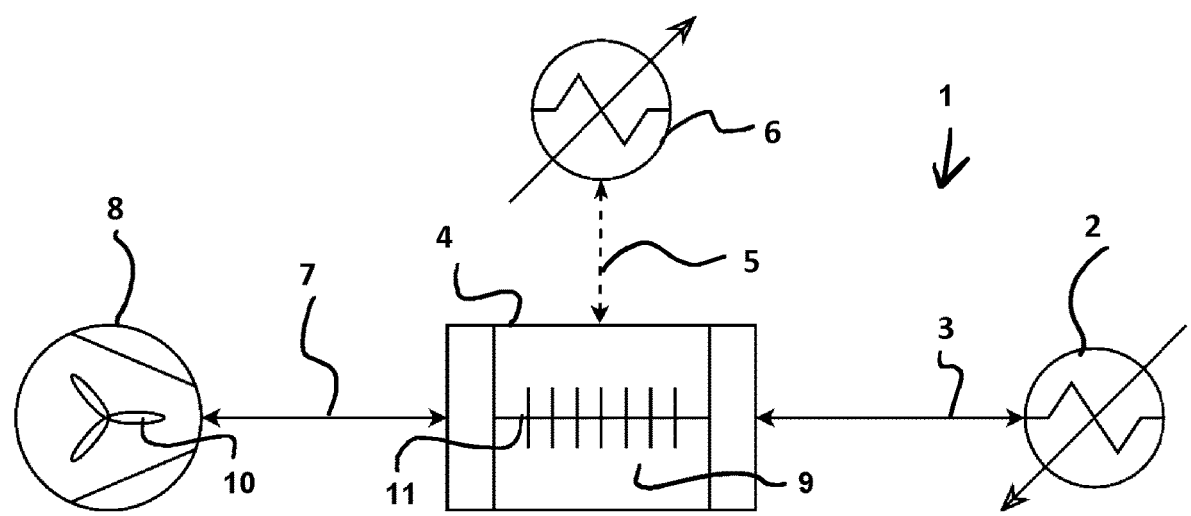
Fig. 1: system of 3-way heat exchange

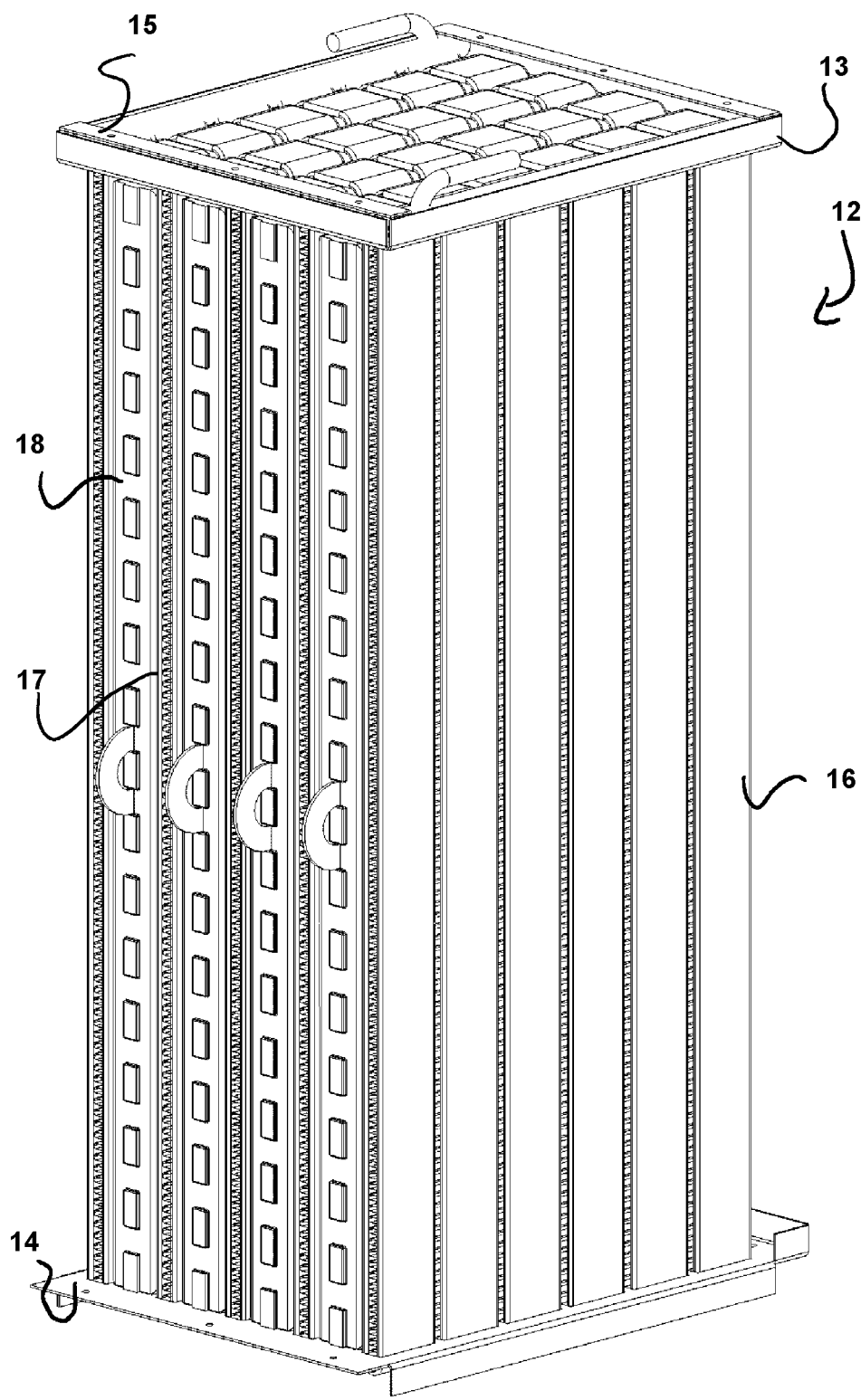
Fig. 2: serpentine microchannel apparatus for 3-way heat exchange

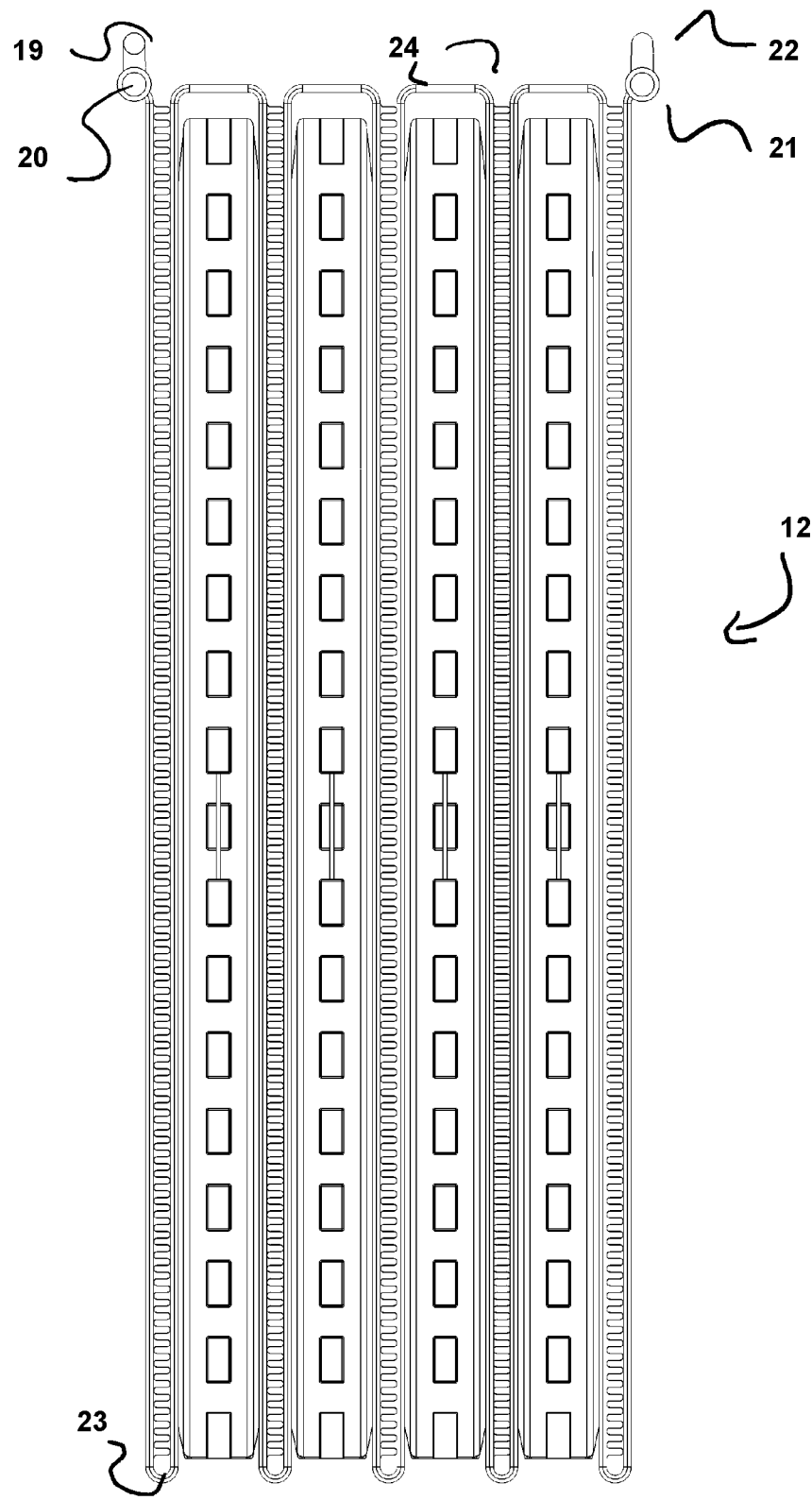
Fig. 3: serpentine microchannel apparatus for 3-way heat exchange without plates

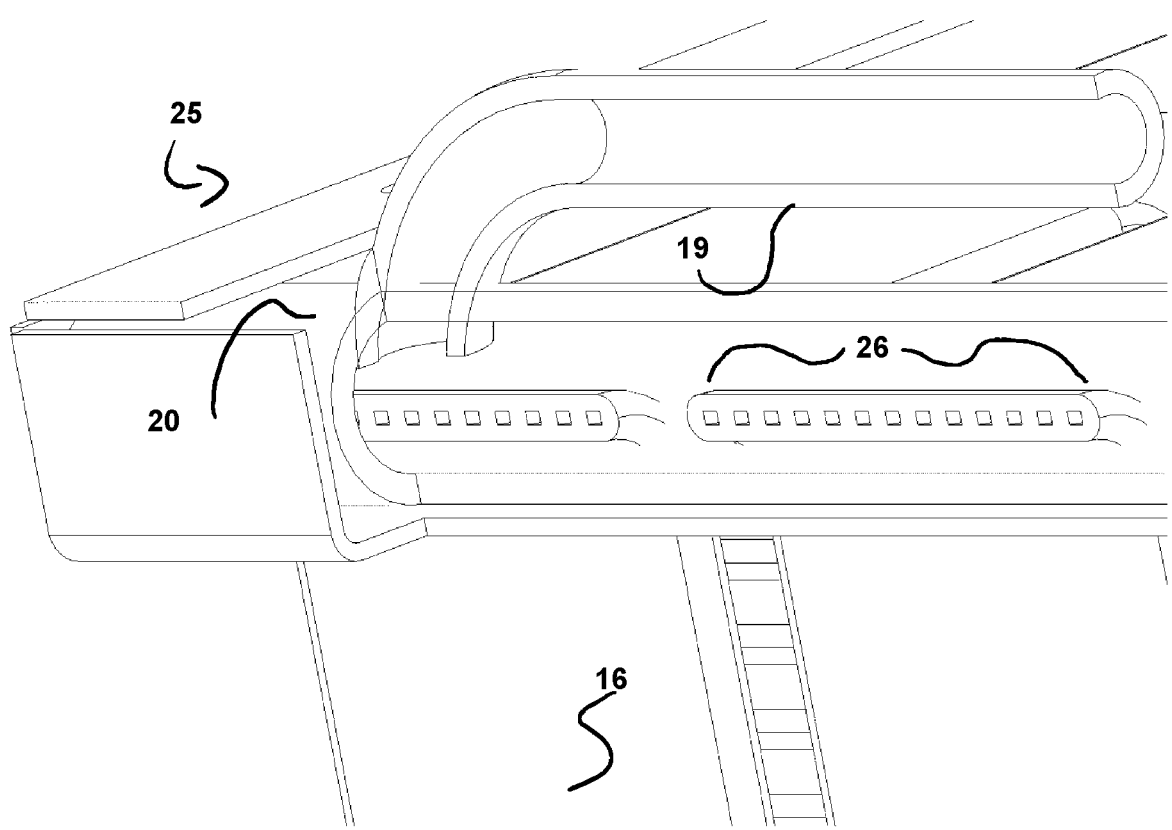
Fig. 4: serpentine microchannel connection

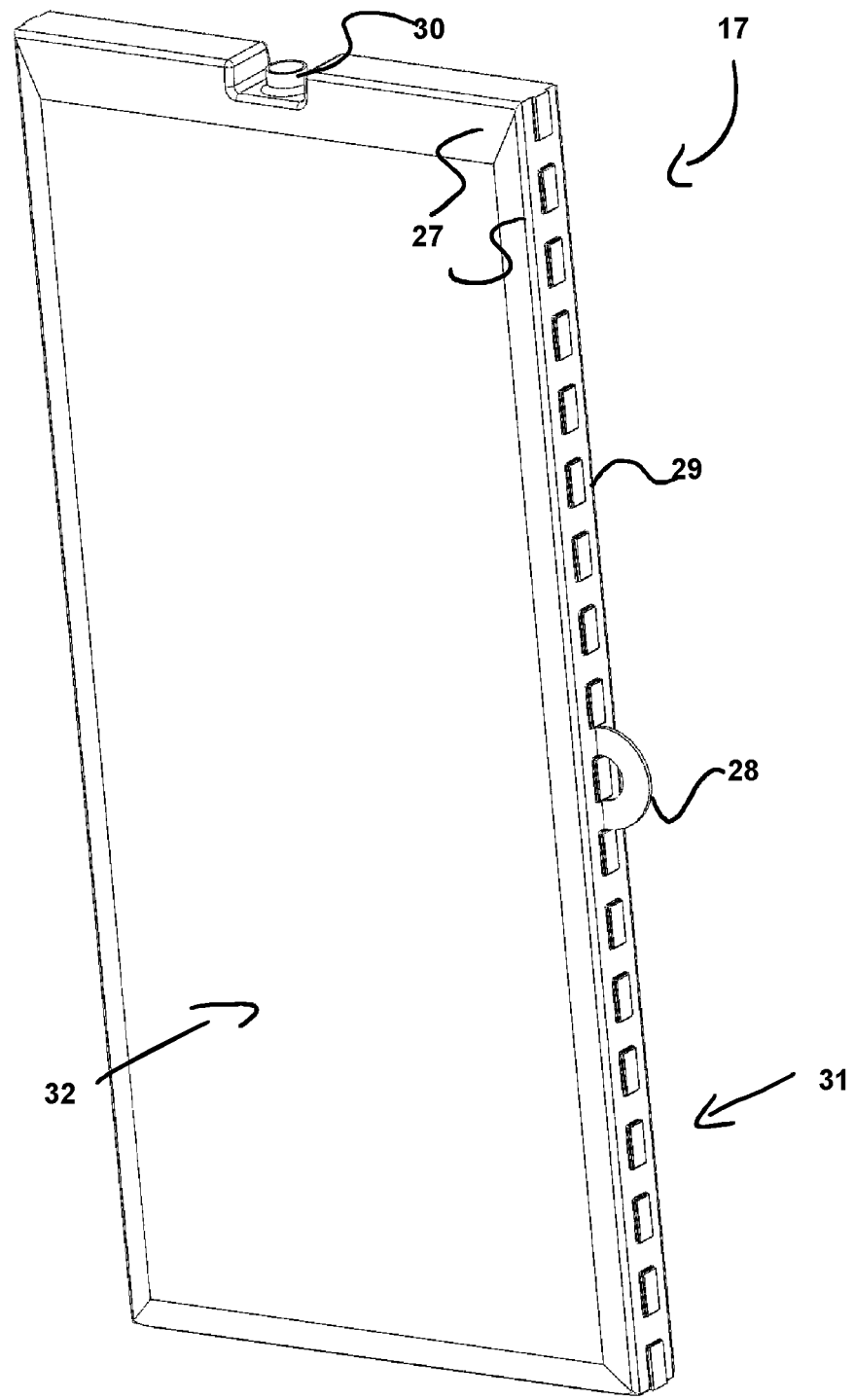
Fig. 5: PCM cell

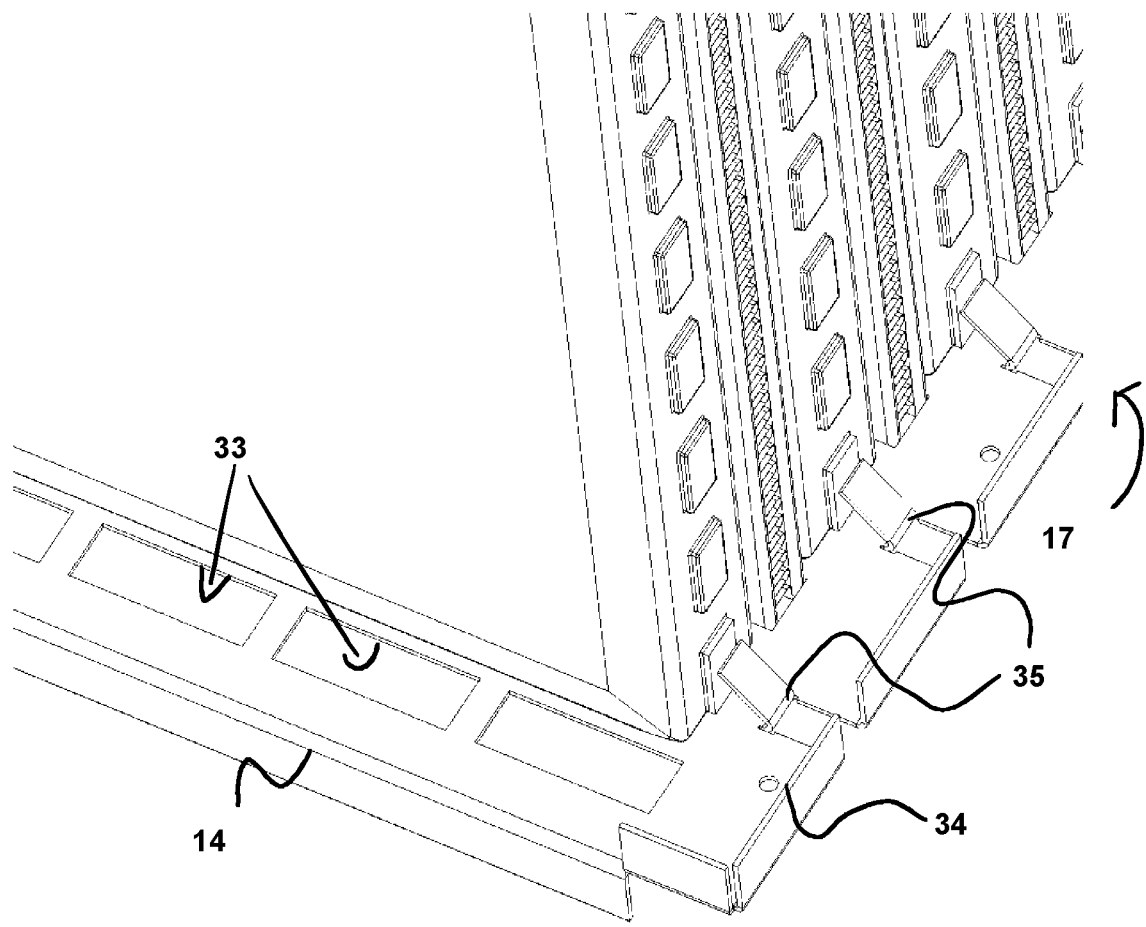
Fig. 6: serpentine microchannel plate rear view

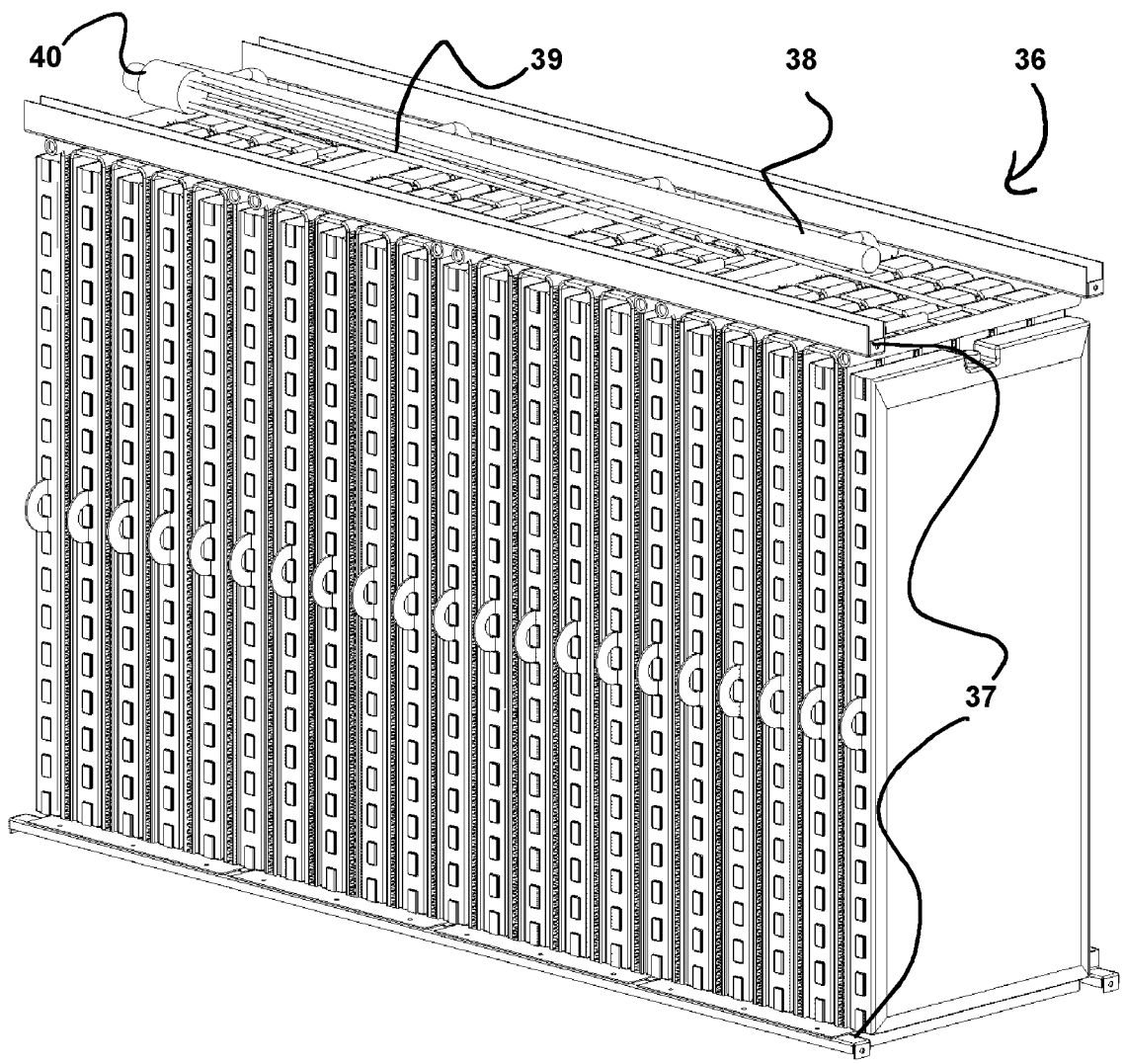
Fig. 7: serpentine microchannel combination

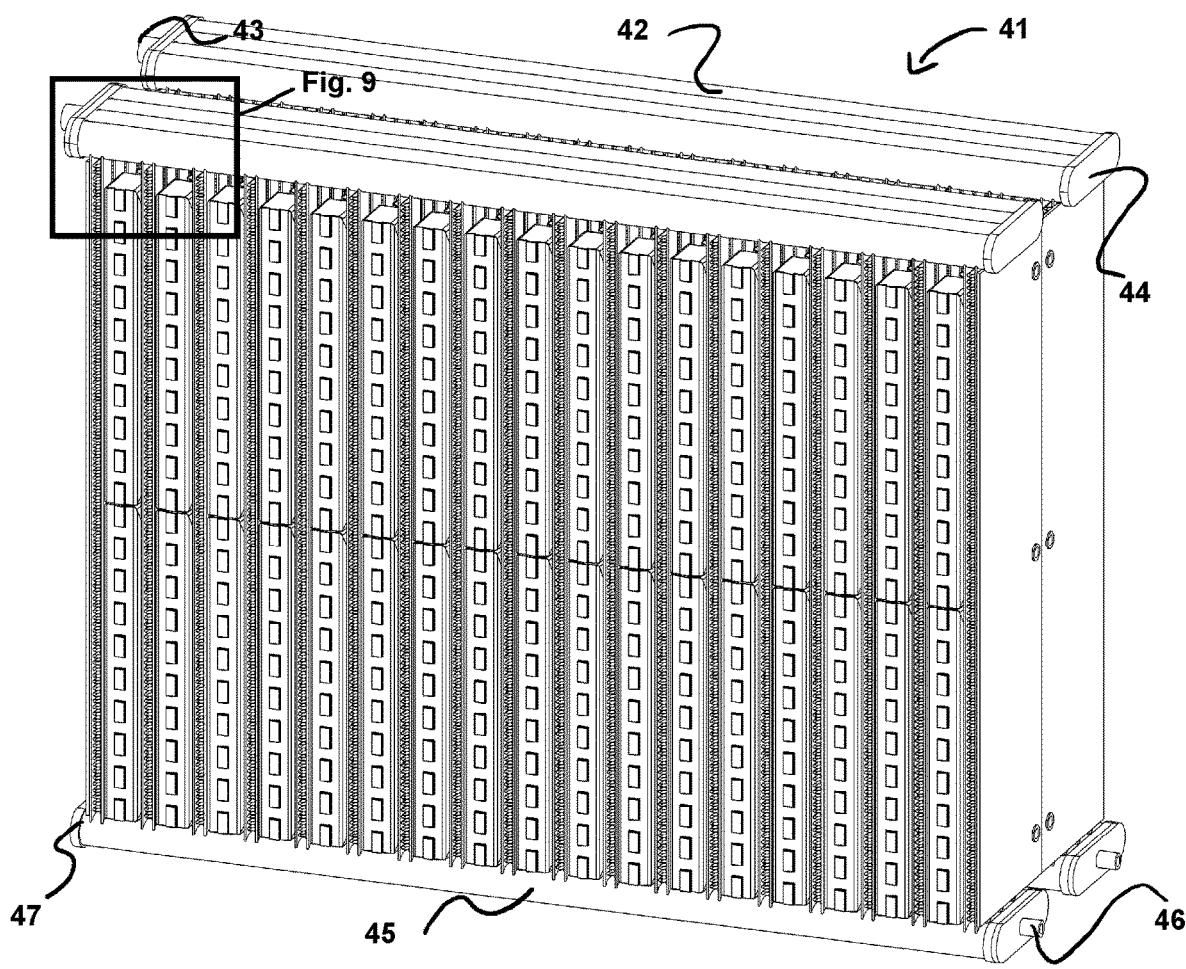
Fig. 8: vertical microchannel apparatus for 3-way heat exchange

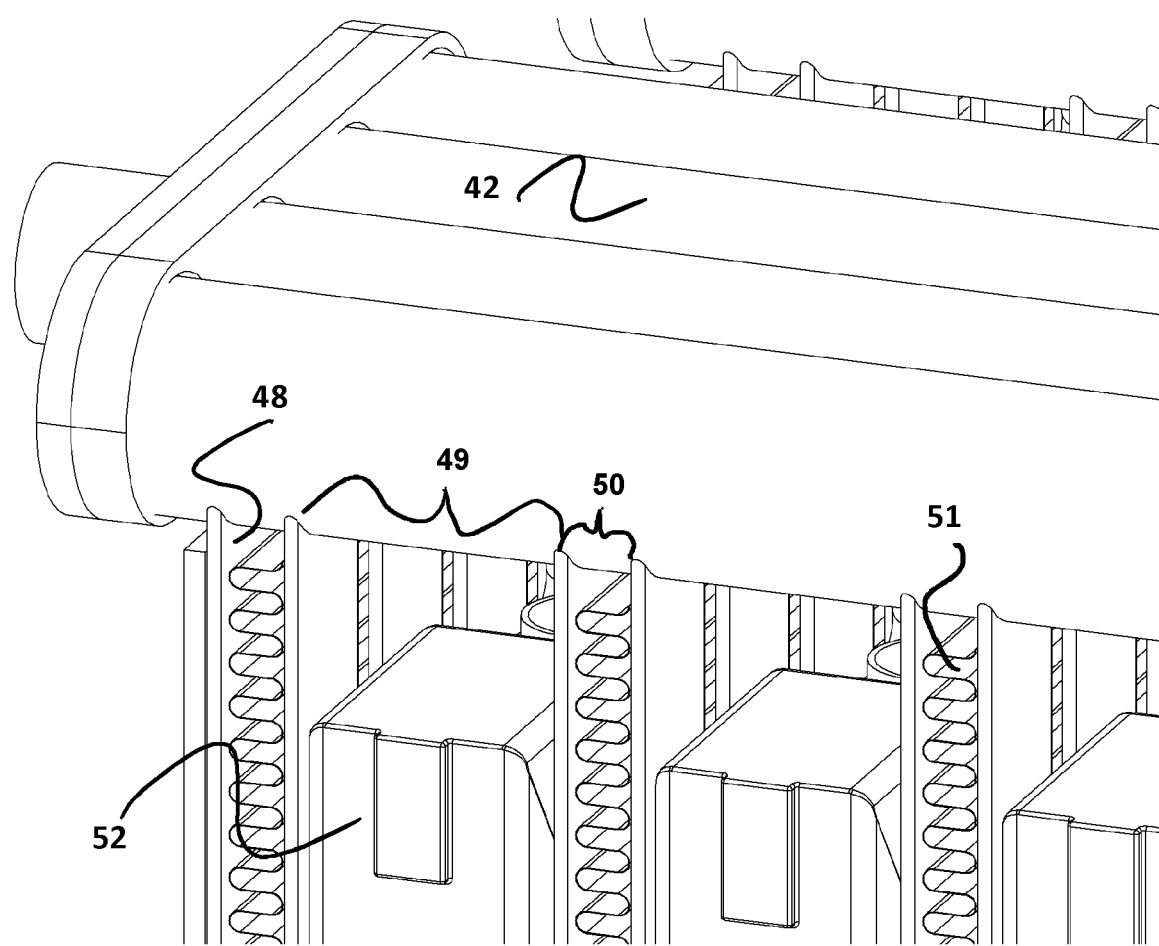
Fig. 9: detailed view of vertical microchannel apparatus

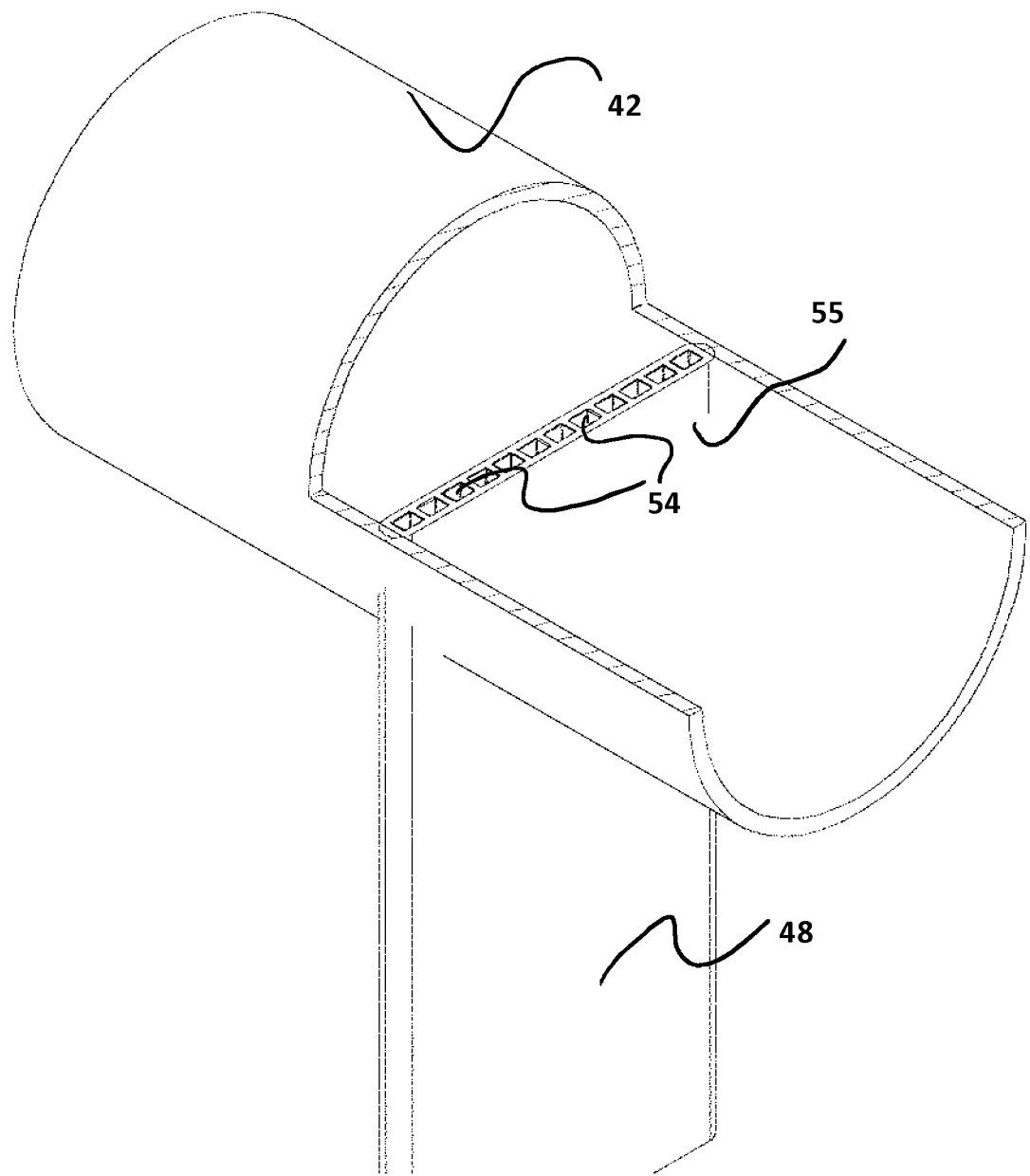
Fig. 10: vertical microchannel and header connection

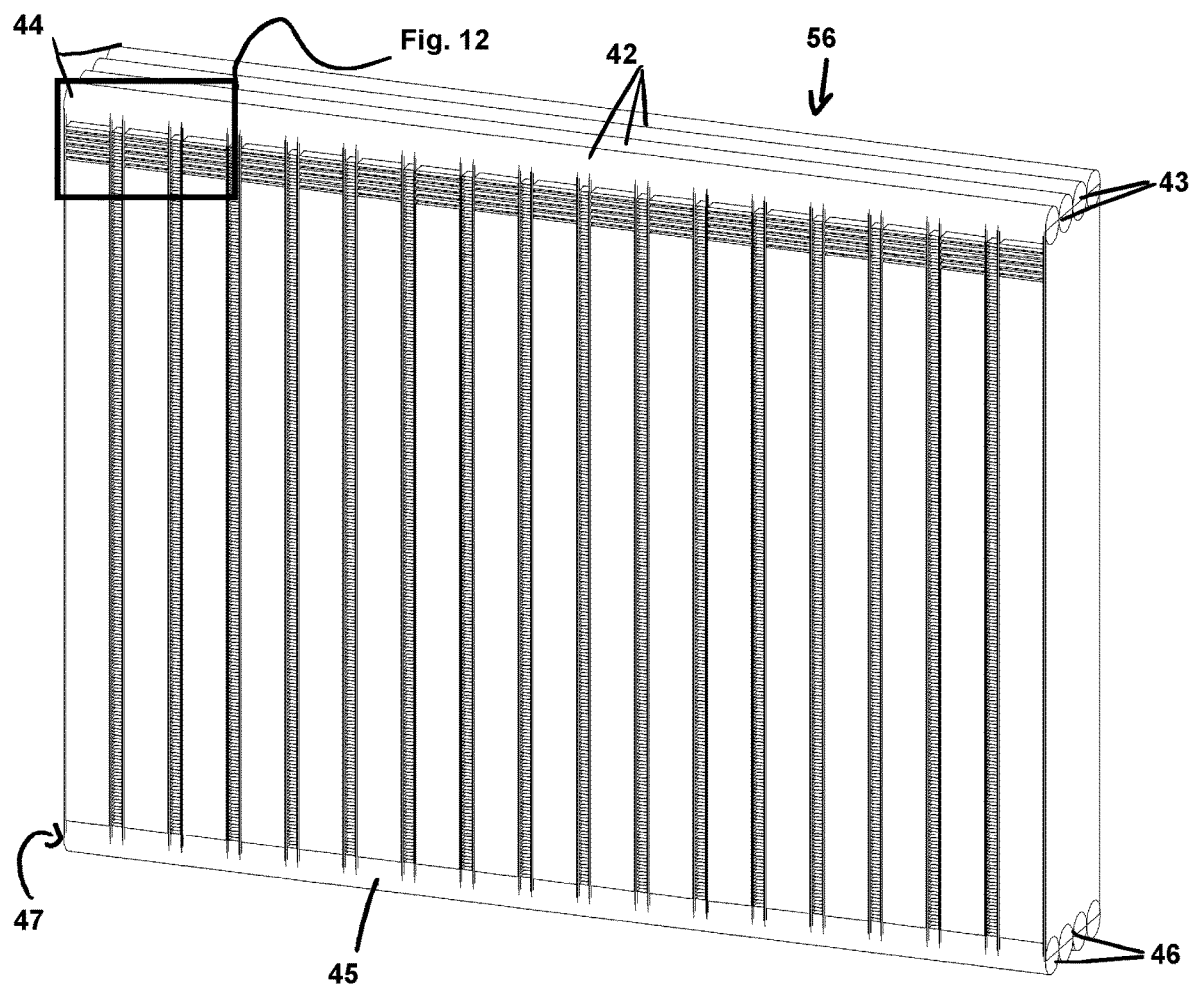
Fig. 11: alternative vertical tube microchannel apparatus for 3-way heat exchange

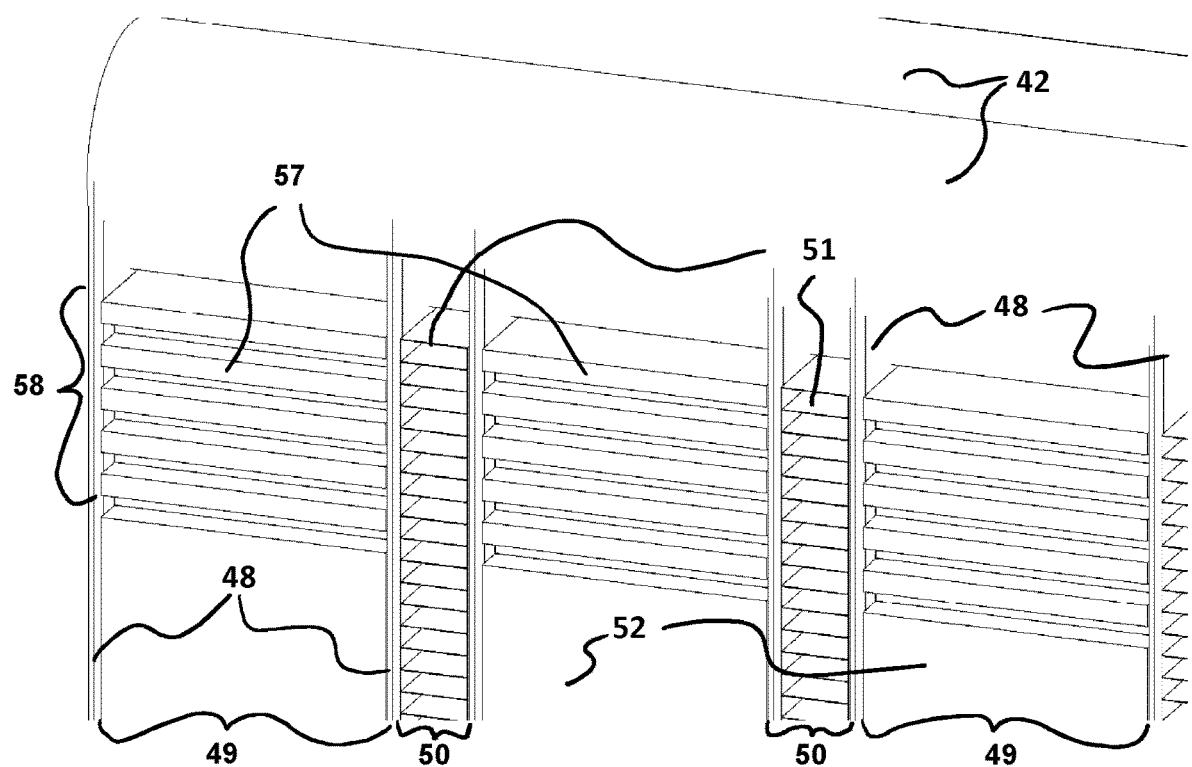
Fig. 12: detailed view of alternative vertical microchannel apparatus

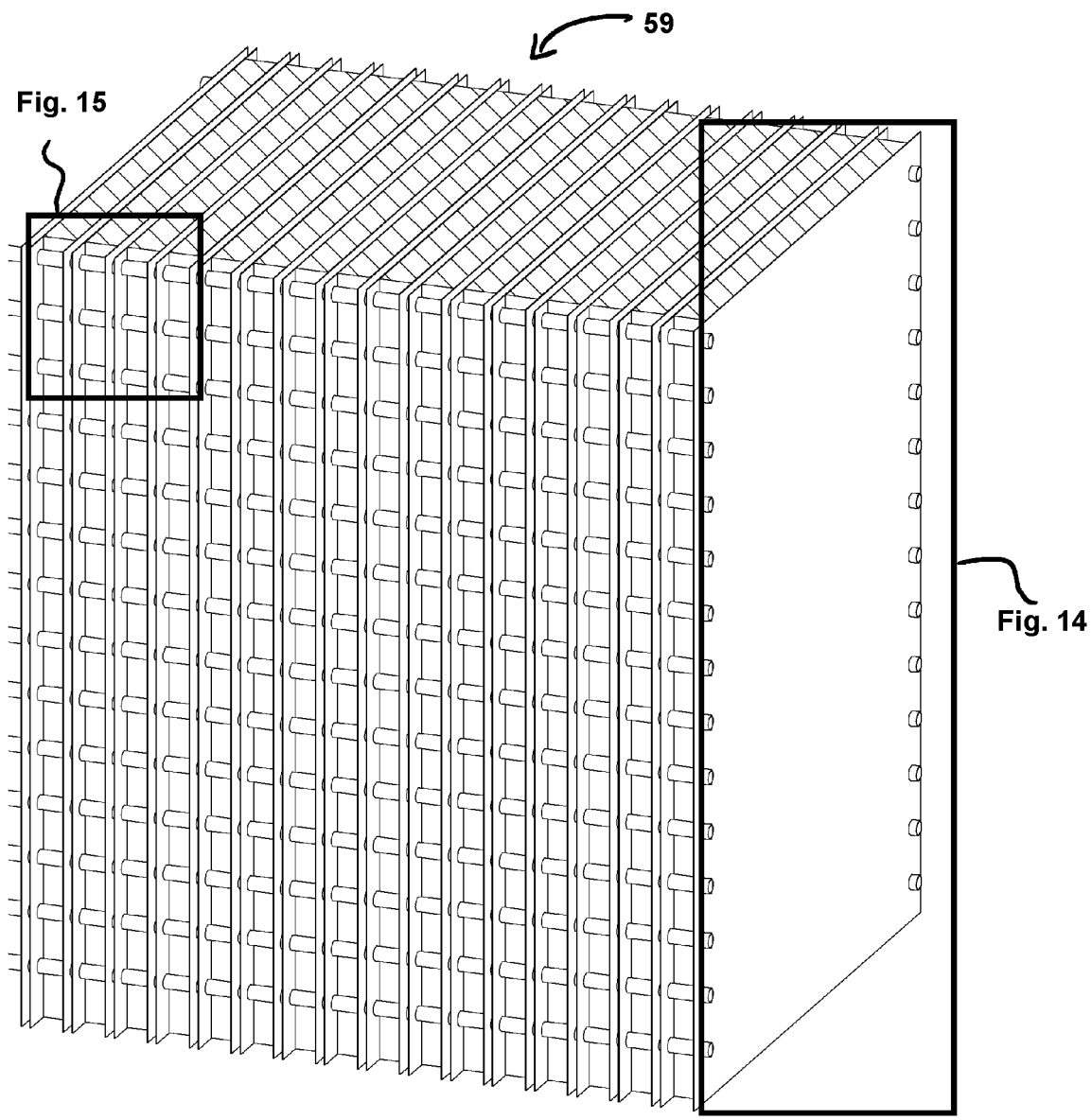
Fig. 13: fin and tube radiator apparatus for storing and releasing heat

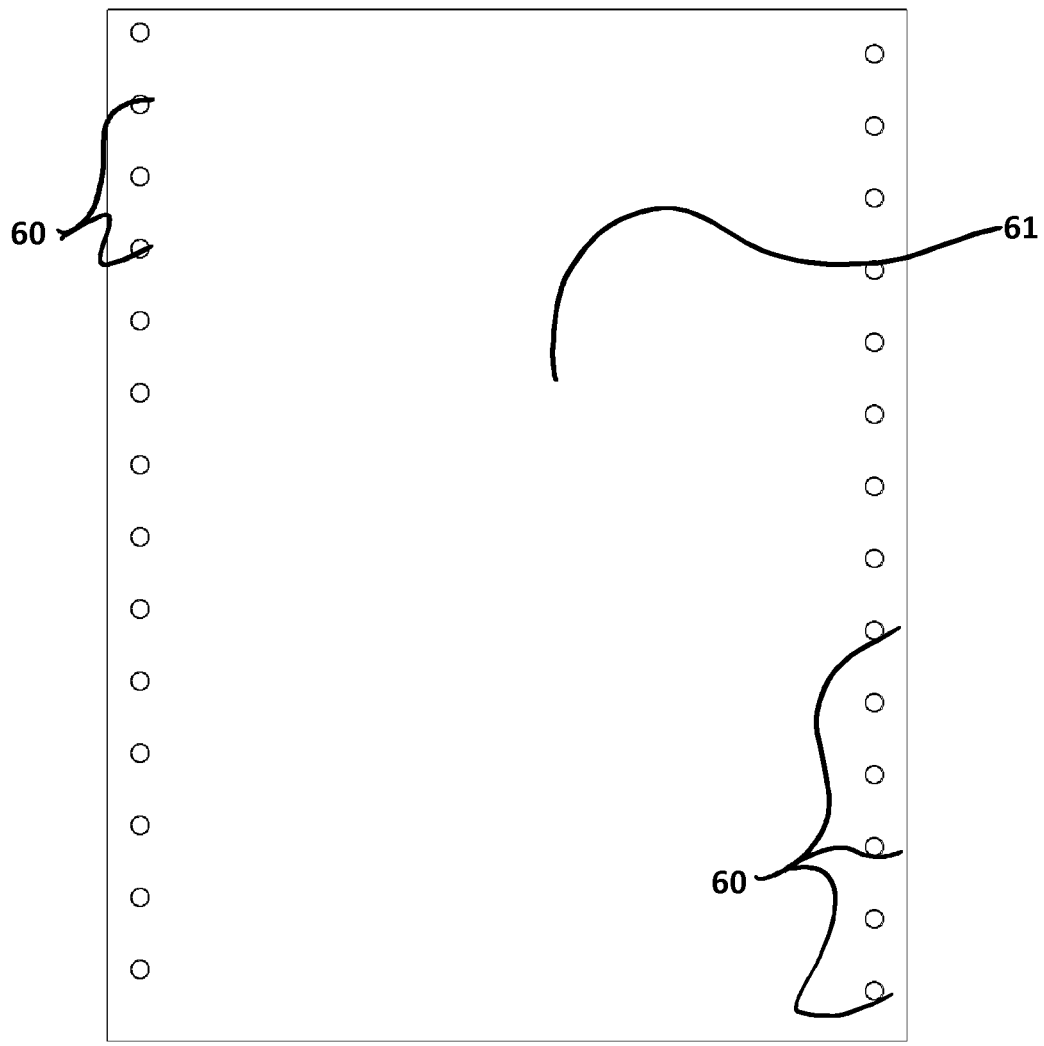
Fig. 14: detailed side view of fin and tube radiator

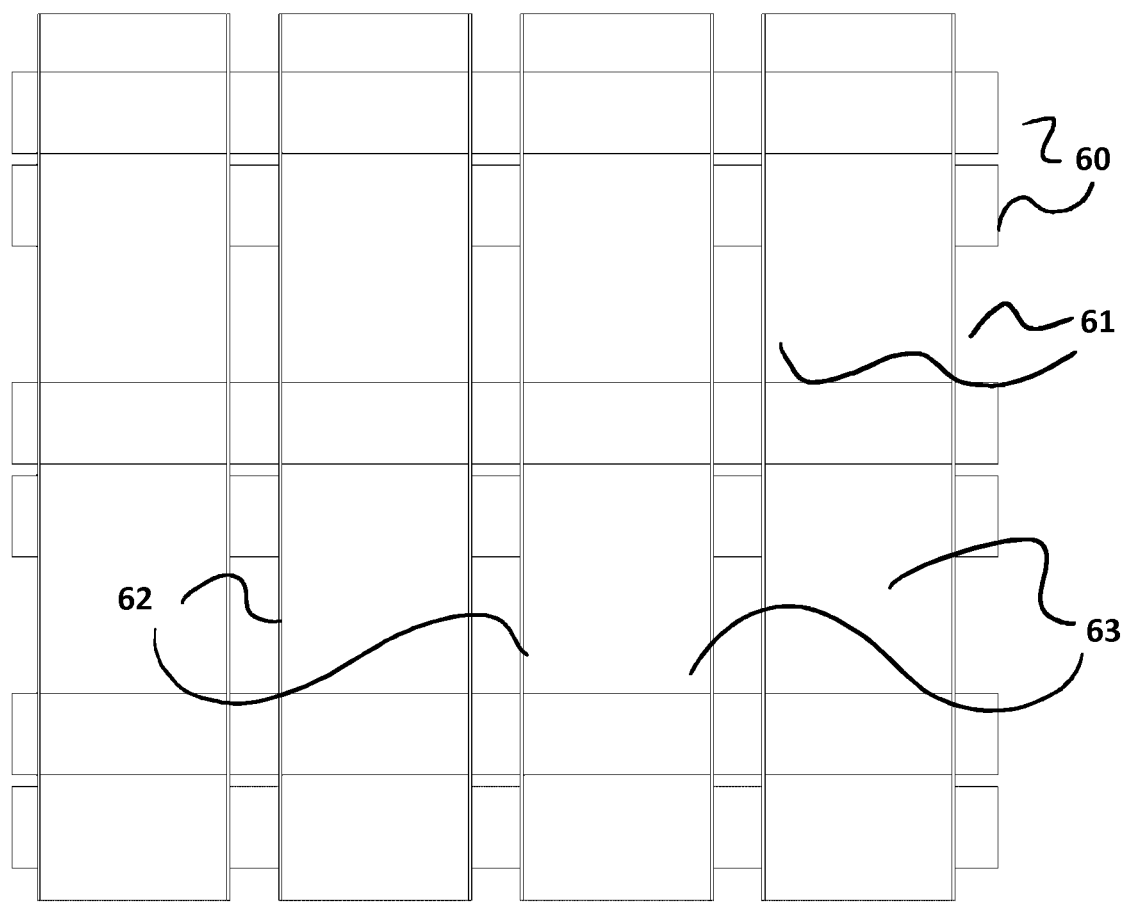
Fig. 15: detailed front view of fin and tube radiator

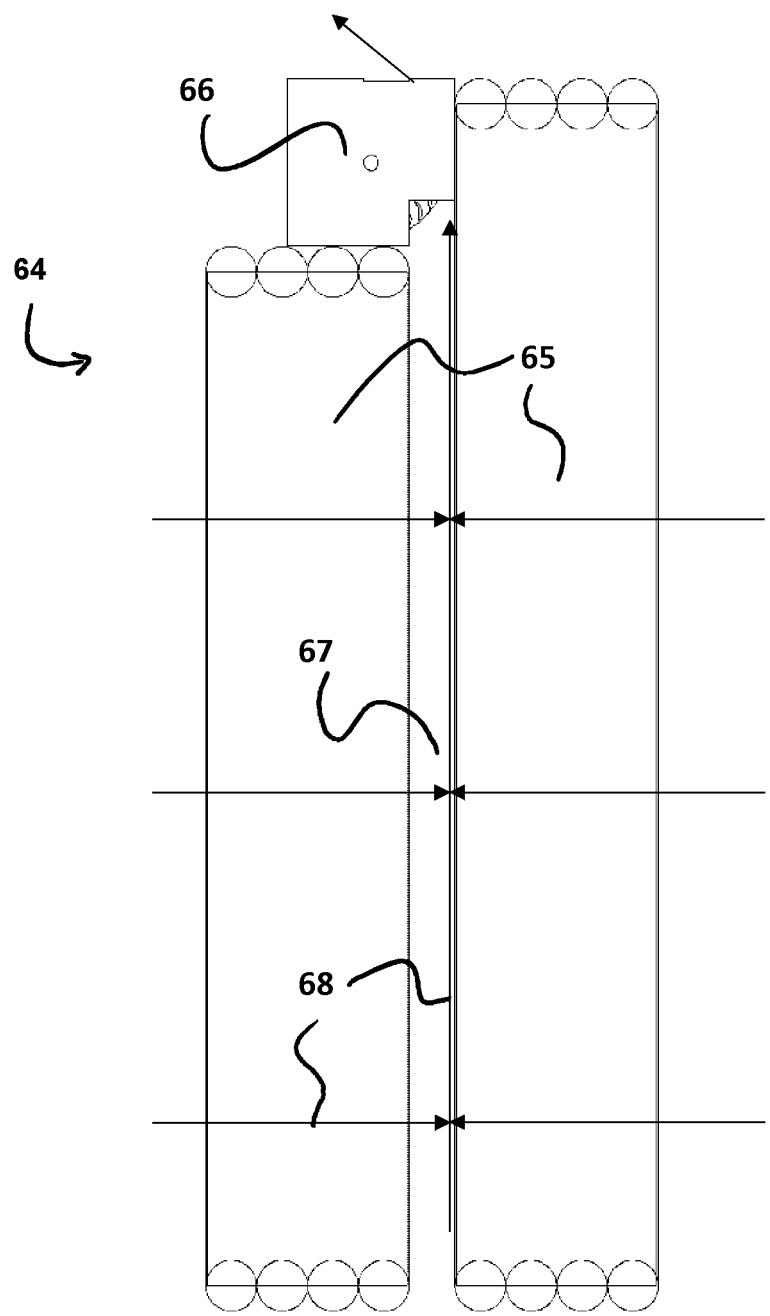
Fig. 16: core configuration

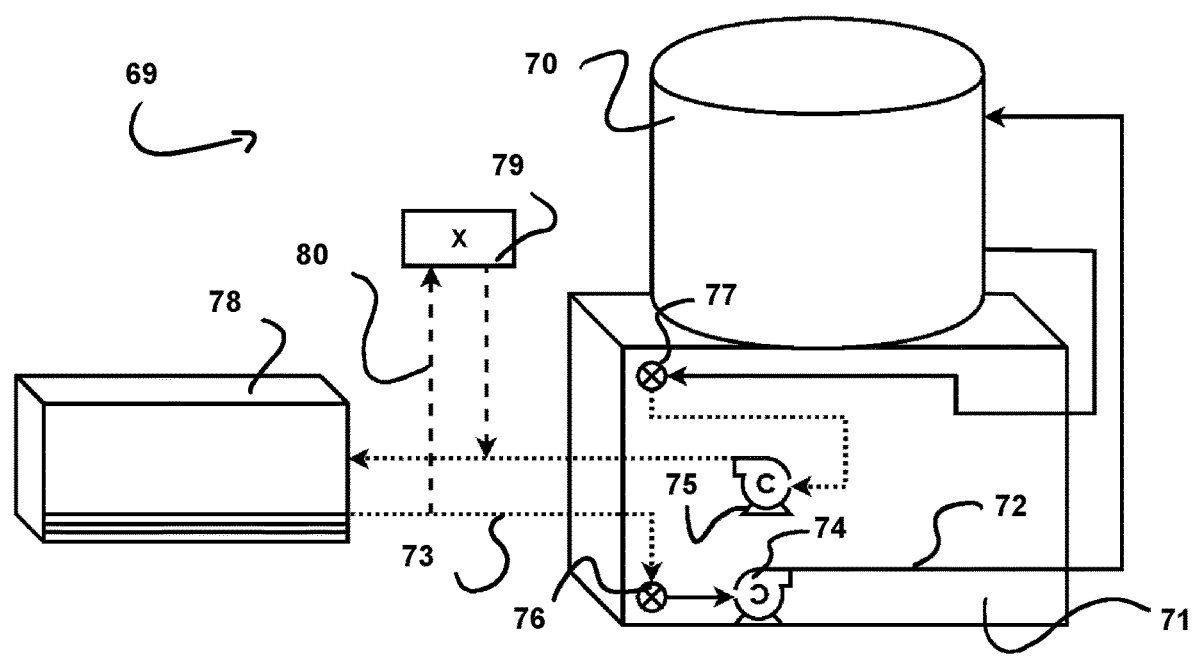
Fig. 17: pumped fluid apparatus for storing and releasing heat

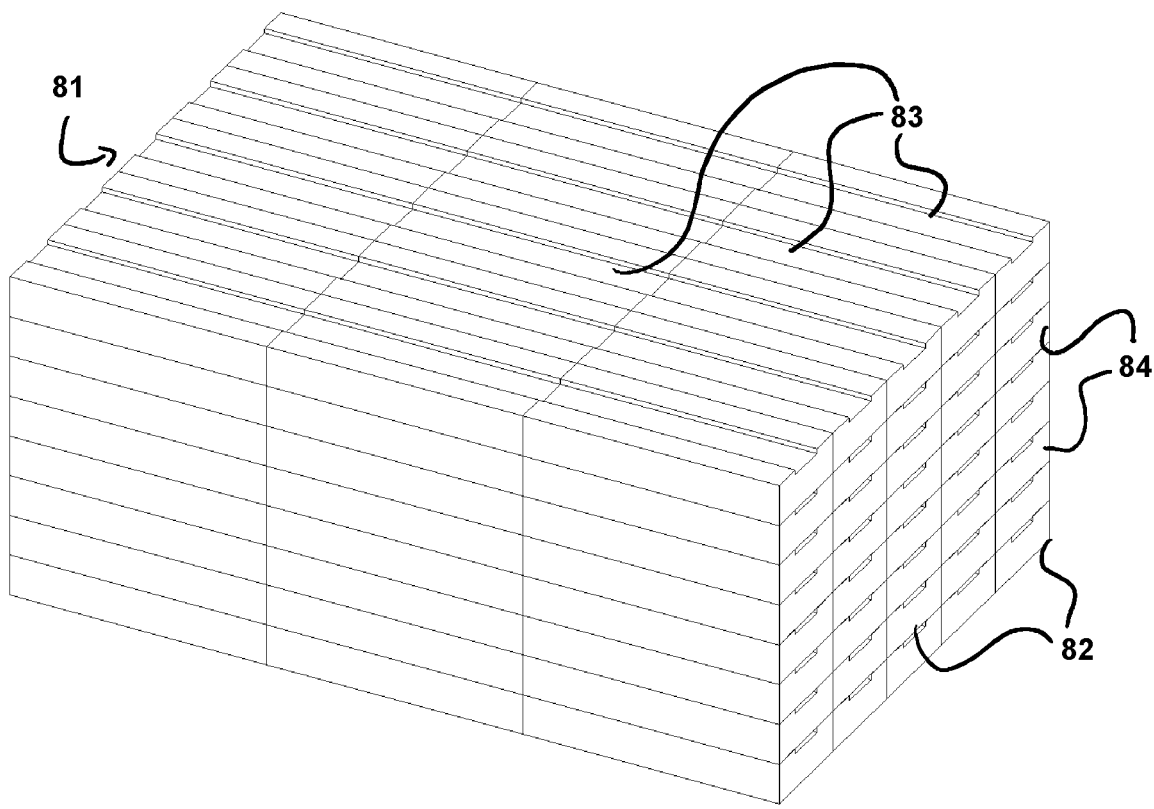
Fig. 18: heat exchanger of pumped fluid system

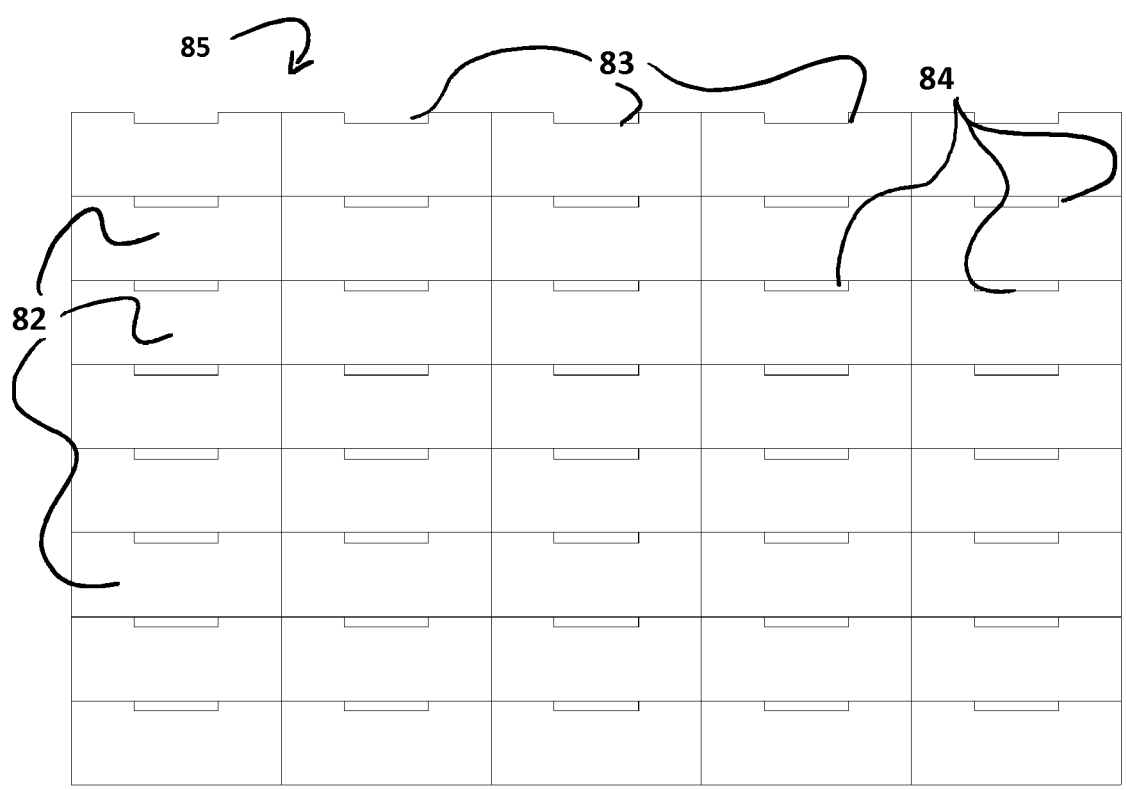
Fig. 19: detailed side view of pumped fluid heat exchanger

HEATING AND COOLING SYSTEMS AND APPARATUSES WITH PHASE CHANGE MATERIALS

FIELD OF DISCLOSURE

This disclosure relates to the field of heating and cooling systems in general and which use phase change materials in particular.

BACKGROUND OF THE DISCLOSURE

Efficient heating and cooling systems such as heat pumps have been proposed to improve energy efficiency by using an electricity driven compression cycle to convert ambient heat into lower or higher grades. This conversion process is far more efficient than heat generation, allowing for heat pumps to achieve a high Coefficient of Performance (COP). However, the introduction of electric heat pumps into the power grid results in peaks in power demand as many facilities require electricity at similar times throughout the day. Home heating and cooling alone accounts for approximately sixty (60%) of residential peak electricity usage.

Peak power demand poses a challenge for power utilities. In North America, electricity usage peaks can occur in the morning when people get up, turn on their heat and shower and again at the end of the day when people return home from work and heat up their home and cook. In summer, peaks can occur during the hottest part of the day when air conditioning usage is at its peak. It is costly for power utilities to provide enough electrical power generating capacity to meet peak demand because this leads to over-capacity during off-peak periods and a lower return on investment. The shift to power generation from renewable energy sources such as solar and wind can also pose challenges because peak power generation generally does not occur during peak usage.

To address this problem, shifting electricity usage has been proposed to even out energy usage and in turn energy generation. Shifting is achieved by storing electricity during off-peak periods for use during on-peak periods. However, the off-peak storage of electricity for later on-peak remains a challenge. Off-peak electricity can be stored in electrical batteries or mechanical systems. However, such systems are generally expensive and, in many cases, difficult to install in homes.

Phase change materials, also abbreviated in the present disclosure as "PCM", have also been proposed for storing thermal energy generated during an off-peak period for use during an on-peak period. However, attempts at creating cost effective and high-performance products for storing heat with technology such as heat pumps have not been successful.

SUMMARY OF THE DISCLOSURE

In one implementation, the present disclosure relates to a system wherein a phase change material is used with a supply of heat and/or cooling fluid (one or more heat pump(s) using an air-source, water-source, or geothermal source for example) also referred to in the present disclosure as a "source", and a supply of a distribution fluid (one or more fan(s) or fluid pump(s) for example) also referred to in the present disclosure as a "distributor", to provide a means for storing and releasing heat energy through one or more heat exchangers thus reducing the need to use the source, particularly during on-peak periods when power rates are higher. This lowers the cost of power and reduces greenhouse gas emissions for power utilities by reducing peaks in demand caused by heating and cooling.

In another implementation, the present disclosure relates to a system for selectively heating and cooling a thermal load including a three-way heat exchange apparatus, a source apparatus for selectively heating and cooling a source fluid, a phase change material for selectively storing heating and cooling potential, and a distribution apparatus for selectively distributing heating and cooling to the thermal load from a distribution fluid, wherein the three-way heat exchange apparatus is connected to the phase change material by an interface between the heat exchange apparatus and the phase change material, wherein the interface permits the transfer of heating and cooling potential between the heat exchange apparatus and the phase change material, the source apparatus by a source conduit running in a loop between the heat exchange apparatus and the source apparatus, wherein the source conduit is capable of carrying the source fluid, and the distribution apparatus by a distribution conduit running in a loop between the heat exchange apparatus and the distribution apparatus, wherein the distribution conduit is capable of carrying the distribution fluid.

In another implementation, the present disclosure relates to systems including a 3-way heat exchanger which serves as an interface between the source, the phase change materials and the distributor, wherein the 3-way heat exchanger comprises of a microchannel heat exchanger which also forms the source conduit, and distributor conduit. In operation, fluid originating from the source travels through microchannel tubes in the microchannel heat exchanger, causing a heat exchange into the PCM, possibly resulting in a phase change in the PCM (depending upon the heat energy in the fluid), storing heating or cooling potential in latent heat and/or specific heat. A fan may be used to circulate distribution fluid through the heat exchanger, absorbing or dissipating heat in the PCM and/or fluid from the source, and dissipating this energy into the distribution fluid.

In another implementation, the present disclosure relates to a system including a 3-way heat exchanger which serves as an interface between the source, the PCM and a distribution fluid, wherein the 3-way heat exchanger includes wherein a fin and tube heat exchanger which also forms the source conduit, and distributor conduit. Fluid originating from the source travels through tubes in the fin and tube heat exchanger, causing a heat exchange with the fins, causing a heat exchange into the PCM, possibly resulting in a phase change in the PCM (depending upon the heat energy in the fluid), storing heating or cooling potential in latent heat and/or specific heat. A fan may be used to circulate distribution fluid through the heat exchanger, absorbing or dissipating heat with the PCM and/or fluid from the source, and dissipating this energy into the distribution fluid In another aspect, the present disclosure relates to a system including a source, a PCM, a source fluid, a distribution fluid and a modular pumped fluid system to exchange heat between the source, the PCM, and the distributor. In operation, the pumped fluid system circulates the heat distribution and source fluid to a heat exchanger which interfaces the source, a heat exchanger containing the PCM and/or a heat exchanger which interfaces the distribution fluid. In this way, the system can independently control heat flow between the source, the PCM (eliciting a change if desired), and the distributor.

In another implementation, the present disclosure relates to PCM compositions which are encapsulated in a way which simplifies the process of adding or removing cells of the material from the system. In certain implementations of the disclosure, the PCM composition can be selected from the group consisting of water-salt solutions, water, salt hydrates, paraffins, fatty acids, clathrates and polyethylene glycols. One or more of: nucleating agents, thermally conductive additives, thermally conductive structures, thickening agents can be added to the phase change material to for example stabilize the material or improve thermal conductivity.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 Is a schematic representation of a system of storing and releasing heat with a 3-way heat exchange apparatus for heating and cooling applications according to an embodiment of the present invention;

FIG. 2 is a perspective view of a serpentine microchannel apparatus for 3-way heat exchange according to an embodiment of the present invention, wherein a microchannel core interfaces with a source fluid, phase change material(s) and a distribution fluid;

FIG. 3 is a front view of the apparatus of FIG. 2 without front plates;

FIG. 4 is an enlarged perspective view of a portion of the microchannel tube and header connections of the apparatus of FIG. 2;

FIG. 5 is an enlarged perspective view of the PCM cells of the apparatus of FIG. 2;

FIG. 6 is an enlarged perspective view of the back of apparatus of FIG. 2

FIG. 7 is a perspective view of a combination apparatuses of FIG. 2;

FIG. 8 is a perspective view of a vertical tube microchannel apparatus for 3-way heat exchange according to an embodiment of the present invention, wherein a microchannel core interfaces with a source fluid, one or more phase change material(s) which stand vertically, and a distribution fluid;

FIG. 9 is an enlarged view of a portion of the vertical microchannel tube apparatus of FIG. 8;

FIG. 10 is an enlarged perspective view of a portion of the microchannel tube and header connections of the apparatus of FIG. 8;

FIG. 11 is a alternative version of FIG. 8 according to an embodiment of the present invention, wherein air baffles bridge empty spaces above the phase change material cells (also referred to in the present application as cells) to prevent air leaks;

FIG. 12 is an enlarged view of a portion of the vertical microchannel tube apparatus of FIG. 11;

FIG. 13 is a perspective view of an apparatus for 3-way heat exchange according to an embodiment of the present invention, wherein a fin and tube core interfaces a source, one or more phase change material(s), and a distribution fluid;

FIG. 14 is an enlarged side view of the fin and tube apparatus of FIG. 13;

FIG. 15 is an enlarged front view of the fin and tube apparatus in FIG. 13;

FIG. 16 is a schematic representation of a system including of multiple 3-way heat exchange apparatuses wherein a fan is used to circulate air through the apparatuses via a central air channel in order to heat or cool a space;

FIG. 17 is a schematic representation of a heating and cooling system according to an embodiment of the present invention for absorbing, dissipating, and distributing heat with a source, wherein a modular pumped fluid system exchanges heat between the source, phase change material, and a distributor;

FIG. 18 is a perspective view of a heat exchanger according to an embodiment of the present invention for absorbing, dissipating and distributing heat between a heat distribution fluid and a phase change material; and FIG. 19 is an enlarged side view of the heat exchanger of FIG. 18.

DETAILED DESCRIPTION

Referring to FIG. 1, a system indicated generally as 1 according to an embodiment of the present invention stores and releases heat with a 3-way heat exchanger apparatus 4 in heating and/or cooling applications. In the system 1, the heat exchanger apparatus 4 exchanges heat with: a source system 2 by a source fluid (not shown) carried through a source conduit 3; a PCM 6 by a physical interface 5 and a distributor system 8 by a distributor fluid (not shown) carried through a distribution conduit 7. Embodiments of parts in system 1 are described herein with reference to FIG. 2 to FIG. 19 In some embodiments fluids which are transported by the source conduit 3 may include may include a refrigerant gas such as R22, R410A, R134. Fluids which are transported by the distributor conduit 7 may include air or liquids such as water and/or anti-freeze mixtures such as methanol, ethylene glycol, propylene glycol, and glycerol.

Embodiments of the source system 2 component include heat pump(s), such as air source, or geothermal system(s), furnace(s) boiler(s), or waste heat. Embodiments of the heat exchanger 4 include radiator core(s) for space heating, coil(s) in ducted systems or a heat exchanger as part of a hydronic system. Other embodiments of the heat exchanger 4 include the heat exchangers described with reference to FIG. 2, FIG. 8, FIG. 11 and FIG. 13. Embodiments of distributor system 8 include air source fans, and liquid pumps in a hydronics system. Embodiments of the PCM 6 include salt hydrate based, paraffin wax based or bio-based materials or a combination of two or more such materials. In still further embodiments of the PCM 6, the PCM 6 further comprises includes conductive materials based on carbon, graphite, or metals to improve thermal performance. In some embodiments the conductive materials are formed as powder, flakes, matrices, or foams. Other embodiments of the system 1 include any combination of embodiments of the source system 2, heat exchanger 4, distributor system 8, and PCM 6 listed above, with the necessary conduits and/or physical interfaces to support heat flow between various components of the system. A preferred embodiment of the system 1 of the present invention includes a heat pump as the source system 2, which connects by a pipe (made of copper or other suitable material) as the source conduit 3 to a radiator core indicated generally at 9 in a heating system as the heat exchanger 4 in physical interface 5 with the PCM 6, and uses a fan 10 as the distributor system 8 where the fins 11 in the radiator core are the distributor conduit 7.

In operation of the system 1 in heating mode, the source system 2 supplies heat in the source fluid via the source conduit 3 connected to the heat exchanger 4. The heat which is exchanged travels via the interface 5 into the PCM 6. This heats the PCM 6, storing latent heat and/or specific heat energy in the PCM 6. Any additional heat from the source 2 which is not absorbed into the PCM 6 is absorbed by the distributor system 8, through the distribution fluid via the distribution conduit 7 which connects to the heat exchanger 4. Stored thermal energy in the PCM 6 can be recovered by activating the distributor 8 to absorb heat in the distribution fluid via the distribution conduit 7 from the heat exchanger 4 which is heated by the interface 5 through exchanging heat with the PCM 6. The heated distributor fluid can then be used directly or indirectly to provide heat for a thermal load such as a building.

In operation of the system 1 in cooling mode, the source system 2 absorbs heat in a source fluid via the source conduit 3 connected to the heat exchanger 4. The heat which is exchanged travels via the interface 5 into a phase change material 6. This cools the PCM 6 storing latent and/or specific cooling potential in the PCM 6. Any additional heat which is needed for the source 2 which is not provided by the PCM 6 is provided by the distributor system 8, through the distribution fluid via the distribution conduit 7 which connects to the heat exchanger 4. The stored thermal cooling potential can be recovered by activating the distributor 8 to provide heat in the distribution fluid via the distribution conduit 7 to the heat exchanger 4 which is cooled by the interface 5 through exchanging heat with the PCM 6. The cooled distributor fluid can then be used directly or indirectly to cool a thermal load such as a building.

Referring to FIG. 2, an apparatus according to an embodiment of the present invention relates to a serpentine tube microchannel apparatus indicated generally at 12. The apparatus 12 can in one embodiment by used as the 3-way heat exchanger 4, physical interface 5, phase change material 6, and distribution conduit 7 in the system 1. The apparatus 12 includes a top plate 13 and bottom plate 14, mounting plates 15, microchannel tubes 16, PCM cells 17, and fins 18. The top plate 13 and bottom plate 14 hold the microchannel tubes 16 in place and provide a structure for the apparatus 12. In addition, the bottom plate 14 also has mounting points and helps support the PCM cells 17. The system is described in detail in FIG. 3 to FIG. 7.

Referring to FIG. 3 which shows the apparatus 12 with no plates for clarity, a series of parallel spaced microchannel tubes 16 connect a gas header 20 to a liquid header 21 via a serpentine path of the microchannel tubes 16. The serpentine path is made from an alternating pattern of approximately 180 degree bends 23 and pairs of approximately 90 degree bends 24 in the microchannel tubes 16. The serpentine shape of the microchannel tubes 16 creates a pattern of alternating narrow spaces for fins 18 and wide spaces for PCM cells 17 which contain the phase change material 6. This arrangement provides an optimal balance between heat transfer and size of the apparatus 12. In some embodiments the fins 18 are made of aluminum. The PCM cells 17 when melted exert a static pressure outwards on the tubes 16 ensuring that there is proper contact between the media so the PCM cells 17 can be heated or cooled from both sides.

A gas connector 19 and liquid connector 22 connect the apparatus 12 to the system 1. Referring to FIG. 4 the array of microchannel tubes 16 and connectors 19 pass through the wall of the gas header 20. A mechanical bond 25 is made between these components, allowing fluid to pass from the connector 19, into the header 20 which distributes the fluid, and through the microchannel tubes 16 via holes 26. These holes 26 transport the fluid in a serpentine path to the liquid header 21 which has similar mechanical bonding to the liquid connector 22 and microchannel tubes 16.

Referring to FIG. 5, an apparatus according to an embodiment of the present invention relates to a PCM cell apparatus indicated generally at 17. In some embodiments the phase change material cells 17 are made from plastics such as PET, HDPE, PVC, LDPE, PP, PS, PLA, PC, POM, PA, ABS, or TPO. The apparatus 17 includes chamfered edges 27, a pull tab 28, ribs 29 for added strength and a neck opening 30. During production the cell 17 is filled with PCM 6 when it is in liquid form via the neck 30 and sealed with a cap (not shown) which is bonded to the neck 30 commonly with an ultra sonic sealer. After filling the cell 17, is rotated so that the face of the back face 31 rests against the working surface. This allows for a bubble of air to form in the front face 32. During installation the chamfered edges of the cell 27 provide a mechanical advantage which helps to deform the air bubble in the front face 32 so that the cell 17 can compress and form fit into the spaces created by the approximately 90 degree bends 24 in the microchannel tubes 16. A pull tab 28 allows for the cell 17 to be removed from the heat exchange apparatus 12.

FIG. 6 shows the back side of the apparatus 12 with some of the microchannel tubes 16 and fins 18 hidden for clarity. The bottom plate 14 has cut-outs 33 in the region normally occupied by the fins 18 and microchannel tubes 16. This allows for the outside wall of the microchannel tubes 16 to be bonded to the plate 14 through means such as welding. Cut-outs 33 in the top plate 13 are used in a similar manner. Tabs 35 bent out from the bottom plate 14 prevent the PCM cells 17 from being pushed out the back side of the apparatus 12 during installation. In one embodiment of the invention, the PCM cells 17 are installed via the front of the apparatus 12. Mounting holes 34 in the bottom plate 14 are used to secure the apparatus 12 in a larger assembly with fasteners.

Referring to FIG. 7, the apparatus 12 of FIG. 2 may be connected in series or in parallel with several others to form a larger combination 36. In one such embodiment a combination 36 of apparatuses 12 are joined by a bridges 37 via fasteners which attach to holes in the lower plate 34 and holes in the mounting plates 15. A gas manifold pipe 38 connects to each of the gas connectors 19. Liquid pipes 39 connect each of the liquid connectors 22 to a distributor 40 which helps to evenly distributed the source fluid.

In relation to the system of FIG. 1, the headers 20/21, tubes 16, and fins 18 form part of the heat exchanger 4. The fins 18 act as part of the distributor conduit 7 while the gas pipe 38 and liquid pipes 39 are part of the source conduit 3. With the apparatus 12, the PCM cells 17 exchanges heat through mechanical connection 5 via the tubes 16.

In operation of the apparatus 12 in heating mode, source fluid heated above the ambient and internal heat exchanger temperature by the source 2 enters the gas header 20 via connector 19. The source fluid flows from the header 20 into the microchannel tubes 16. The elevated temperature of the fluid causes heat to conduct into the fins 18 and the cells 17 storing latent heat in the event of a phase change and/or specific heat in the PCM 6 in the cells 17. Ambient temperature distribution fluid, (air in the present embodiment) is circulated through the series of fins 18 by the fan 10 or other air source, causing a heat exchange into the air from the PCM 6 and/or the source fluid by convection and/or conduction due to the lower ambient temperature. Ambient air may be used along with the PCM 6 to match the heat supplied from the source 2 or to provide building heat during the storage cycle. When the PCM 6 has stored sufficient heat, operation may continue by increasing the speed of the fan 10 such that air is heated by the fins 18 at the same rate at which heat is supplied by the source 2 or by reducing the power output of the source 2. Heat is recovered by circulating ambient air which is at a lower temperature than the PCM 6 through the series of fins 18 while the source 2 remains off. This cools the fins 18 and the tubes 16, causing a heat exchange from the PCM 6 to the ambient air. When the latent heat and/or specific heat from the PCM 6 is depleted, the source 2 is reactivated to continue heating and/or storing energy. Source fluid that has circulated through the tubes 16 enters the liquid header tubes 21 and exits through connector 22 and returns back to the source 2.

In operation in cooling mode, the apparatus 12 operates with similar mechanics as described above, but with reversed directions of heat flow. Fluid cooled below ambient temperature and internal heat exchanger core temperatures by the source 2 enters through the liquid headers 21 through port 22, and tubes 16 to cool the PCM 6 in the cells 17 and fins 18. Latent heat and/or specific heat is stored in the PCM 6 as cooling potential while ambient air is circulated through the fins 18 to provide any additional heat for the source which is not provided by the PCM 6. The fluid returns to the source 2 by exiting the heat exchanger through the gas header 20 through the gas connector 19. When the PCM 6 has stored sufficient cooling potential, operation may continue by increasing the speed of the fan 10 to match air cooling by the fins 18 to the cooling by the source 2 or by reducing the power output of the source 2. Cooling potential is recovered by circulating ambient air which is at a higher temperature than the PCM 6 while the source 2 remains off, warming the fins 18 and tubes 16, causing a heat exchange from the ambient air to the cooled PCM 6. When the latent heat and/or specific heat from the PCM 6 is depleted, the source 2 is activated to continue cooling.

Referring to FIG. 8, an apparatus according to an embodiment of the present invention relates to a vertical tube microchannel apparatus indicated generally at 41 for 3-way heat exchange. The apparatus 41 can in one embodiment by used as the heat exchanger 4. The apparatus 41 includes a top header indicated generally at 42 has an end with ports 43 and another end 44 which is closed. A bottom header indicated generally at 45 has an end with ports 46 and another end 47 which is closed. Ports are connectable to a source system such as the source system 2.

A series of parallel spaced microchannel tubes run between the top header tubes 42 and corresponding bottom header tubes 45. Referring to FIG. 9 and FIG. 10, each microchannel tube 48 is mechanically bonded to the wall 55 of a top header tube 42. Holes 54 in the microchannel tube 48 extend through the wall 55 such that the microchannel tubes 48 are in connection with the interior indicated generally at the top header tubes 42. The microchannel tubes 48 are mechanically bonded in the same manner to the bottom header tubes 45 such that the microchannel tubes 48 are in connection with the interior of the bottom header tubes 45.

The microchannel tubes 48 generally may alternate between being widely spaced by the wide spacings 49 and being narrowly spaced by narrow spacings 50.

Aluminum fins 51 run between microchannel tubes 48 in the narrow spacings 50. Encapsulated phase change material(s) 52 containing materials such as the PCM 6 in some embodiments are removable located between microchannel tubes 48 in the wide spacings 49. These cells 52 are similar to apparatus 17 shown in FIG. 2. The tubes 48 are spaced with alternating spacings 49 and 50 to provide an optimal heat exchange to both the cells 52 and fins 51. The vertical orientation of the cells 52 creates a static fluid pressure outward on the tubes 48, ensuring proper surface contact for heat exchange and enabling the PCM in the cells 52 to be heated or cooled from both sides. Performance benefits from two sided cells 52 contact with the tubes 48 allows for a thicker PCM layer in the cells 52, reducing the overall size of the apparatus 41 by improving packing efficiency.

In relation to the system of FIG. 1, the headers 42/45, tubes 48, and fins 51 form part of the heat exchanger 4. The headers 42 and tubes 48 also act as part of the source conduit 3 while the fins 51 also act as part of the distributor conduit 7. With the apparatus 41, the PCM cells 52 exchanges heat through mechanical connection 5 via the tubes 48 to the heat exchanger 4.

In operation of the apparatus 41 in heating mode, source fluid heated above the ambient and internal heat exchanger temperature by the source 2 enters the heat exchanger header 42 via port end 43. The source fluid flows from the header 42 into the microchannel tubes 48. The elevated temperature of the fluid causes heat to conduct into the fins 51 and the cells 52 storing latent heat in the event of a phase change and/or specific heat in the PCM 6 in the cells 52. Ambient temperature distribution fluid, (air in the present embodiment) is circulated through the series of fins 51 by the fan 10 or other air source, causing a heat exchange into the air from the PCM 6 and/or the source fluid by convection and/or conduction due to the lower ambient temperature. Ambient air may be used along with the PCM 6 to match the heat supplied from the source 2 or to provide building heat during the storage cycle. When the PCM 6 has stored sufficient heat, operation may continue by increasing the speed of the fan 10 such that air is heated by the fins 51 at the same rate at which heat is supplied by the source 2 or by reducing the power output of the source 2. Heat is recovered by circulating ambient air which is at a lower temperature than the PCM 6 through the series of fins 51 while the source 2 remains off. This cools the fins 51 and the tubes 48, causing a heat exchange from the PCM 6 to the ambient air. When the latent heat and/or specific heat from the PCM 6 is depleted, the source 2 is activated to continue heating and/or storing energy. Source fluid that has circulated through the tubes 48 enters the lower header tubes 45 and exits at port end 46 and returns back to the source 2.

In operation in cooling mode, the apparatus 41 operates with similar mechanics as described above, but with reversed directions of heat flow. Fluid cooled below ambient temperature and internal heat exchanger core temperatures by the source enters through the bottom headers 45 through port 46, and tubes 48 to cool the PCM 6 in the cells 52 and fins 51. Latent heat and/or specific heat is stored in the PCM 6 as cooling potential while ambient air is circulated through the fins 51 to provide any additional heat for the source which is not provided by the PCM 6. The fluid returns to the source by exiting the heat exchanger through the header 42 through port 43. When the PCM 6 has stored sufficient cooling potential, operation may continue by increasing the speed of the fan 10 to match air cooling by the fins 51 to the cooling by the source 2 or by reducing the power output of the source 2. Cooling potential is recovered by circulating ambient air which is at a higher temperature than the PCM 6 while the source 2 remains off, warming the fins 51 and tubes 48, causing a heat exchange from the ambient air to the cooled PCM 6. When the latent heat and/or specific heat from the PCM 6 is depleted, the source 2 is activated to continue cooling.

Referring to FIG. 11, an apparatus according to an embodiment of the present invention relates to an alternative vertical tube microchannel apparatus indicated generally at 56. It is similar to the vertical microchannel apparatus 41 as depicted in FIG. 8. This alternative apparatus 56 includes top header indicated generally at 42 has an end with ports 43 and another end 44 which is closed. A bottom header indicated generally at 45 has an end with ports 46 and another end 47 which is closed. Referring to the detailed view of FIG. 12 the alternative apparatus 56 also has microchannel tubes 48 which create alternating wide 49 and narrow 50 spacings for fins 51 and encapsulated phase change material 52. During operation in both heating and cooling mode, the alternative apparatus 56 functions in an identical way to apparatus 41.

One distinction of the alternative apparatus 56 is the inclusion of air baffles 57 which bridge the gap 58 between the cells 52 and the header 42 to minimize leakage of distribution fluid through this region. The air baffles 57 are made from an elastic material which expands and contracts as the gap 58 size changes during thermal cycling.

Referring to FIG. 13, an apparatus according to an embodiment of the present invention relates to a fin and tube apparatus indicated generally at 59 for 3-way heat exchange which in one embodiment can be used as the heat exchanger 4. The source system 2 supplies fluid heated or cooled as compared to the ambient conditions, into tubes 60. The tubes 60 contact fins 61 which contact removable cells 63 of encapsulated phase change material(s) 6. Fins 61 may be spaced unevenly to provide an optimal heat exchange to both the PCM 6 and ambient fluid which flows through gaps 62 between the fins. The vertical orientation of the cells 63 creates a static fluid pressure outward on the fins 61 which surround the cells 63 while the material is in a liquid or solid-liquid form to ensure proper surface contact for heat exchange, enabling the cells 63 and the PCM 6 therein to be heated or cooled from both sides. Performance benefits from two sided PCM 6 contact with the fins 61 allows for a thicker cell layer 63, reducing the overall size of the unit by improving packing efficiency. In relation to the system diagram FIG. 1, the portion of the apparatus consisting of the tubes 60, and fins 61 forms part of the heat exchanger 4. The tubes 60 also act as part of the source conduit 3 while the gaps 62 between the fins 61 also act as part of the distributor conduit 7. With the apparatus 59, the PCM 6 exchanges heat through mechanical connection 5 via the fins 61 to the heat exchanger 4.

In operation in heating mode, the apparatus 59 operates as described generally in FIG. 1. Fluid heated above the ambient and internal heat exchanger temperature by the source enters the tubes 60. The elevated temperature of the fluid causes heat to conducts into the fins 61, elevating the fin 61 temperature, causing heat to conduct through the cells 63 into the PCM 6 possibly causing a phase change, storing latent heat and/or specific heat in the PCM 6. Ambient air can be circulated through the gaps 62 by the fan 10 or other air source, causing a heat exchange into the air from the PCM 6 and/or the source fluid by convection and/or conduction through the fins 61 and tubes 60 due to the lower ambient temperature. The ambient air 62 may be used along with the PCM 6 to match the heat supplied from the source or to provide building heat during the storage cycle. When the PCM 6 has stored sufficient heat, operation may continue by increasing speed of the fan such that the air 62 is heated by the fins 62 at the same rate which heat is supplied by the source 2 or by reducing the power output of the source 2. Heat is recovered by circulating ambient air which is at a lower temperature than the PCM 6 through the gaps 62 in the fins 61 while the source 2 remains off. This cools the fins 61, and tubes 60, causing a heat exchange from the PCM 6 to the ambient air through the fins 61. When the latent heat and/or specific heat from the phase change material 63 is depleted, the source 2 is activated to continue heating and/or storing energy.

In operation in cooling mode, the apparatus 59 operates with similar mechanics described above, but with reversed directions of heat flow. In this embodiment, fluid cooled below ambient temperature and internal heat exchanger temperatures by the source 2 travels through the tubes 60 to cool the PCM 6 and fins 61. Latent heat and/or specific heat is stored in the PCM 6 as cooling potential while ambient air is circulated through the gaps 62 to provide any additional heat for the source 2 which is not provided by the PCM 6. When the PCM 6 has stored sufficient cooling potential, operation may continue by increasing the speed of the fan 10 to match air cooling by the fins 61 to the cooling by the source 2 or by reducing the power output of the source 2. Cooling potential is recovered by circulating ambient air in the gaps 62 which is at a higher temperature than the PCM 6 while the source 2 remains off, warming the fins 61 and tubes 60, causing a heat exchange from the ambient air to the cooled PCM 6. When the latent heat and/or specific heat from the PCM 6 is depleted, the source 2 is activated to continue cooling.

Referring to FIG. 16, an apparatus according to the present embodiment indicated generally at 64 utilizes a configuration of two rows of one or more apparatuses for 3-way heat exchange 65, such as those described with reference to FIG. 2, FIG. 8, and FIG. 11, to form an air pathway 67 through which air may be circulated by one or more fan(s) 66 the direction of the depicted vectors 68. 3-way heat exchange systems 65 may exhibit a difference in height to improve box packing efficiency. Embodiments of the fan(s) 66 include axial, tangential, and centrifugal style devices. Sourcing air 68 from the center of two rows of heat exchangers 65 reduces the static pressure requirements of the fan(s) 66 as opposed to using a single, thicker row of exchangers. In addition, the use of two rows 65 reduces the overall length of the apparatus as compared to placing the two rows 65 end to end. In relation to the system diagram FIG. 1, the fan 66 serves as the distributor system, while the air pathway 67 serves part of the distributor conduit 7 and the 3-way heat exchange apparatuses serve as the heat exchanger 4.

In operation, the fan 66 is powered by an external power source, creating a low pressure region which causes air flow 68 into the air pathways 67 from ambient space. As the airflows through the 3-way heat exchangers 65, heat is exchanged to/from the air 68. This air 68 enters the fan 66 and is then discharged in order to heat or cool the space containing the apparatus.

Referring to FIG. 17, a heating and cooling system according to the present embodiment indicated generally at 69 includes a source 70, a liquid to PCM heat exchanger 71 and a thermal load 78. The source 70 rests on top of the heat exchanger 71, described in further detail with reference to FIG. 18 and FIG. 19. An source fluid loop defined by line 72 joins the source 70, ports 76/77 of the heat exchanger 71 and a pump 74. A distribution fluid loop defined by the line 73, joins the thermal load 78, ports 76/77 of the heat exchanger 71, and a pump 75.

In other embodiments, one or more additional apparatus 79 may be connected to the distribution loop 73 by parallel connections 80, making the pumped fluid system modular and extendable. In certain embodiments, the apparatus 79 can include a source 70, a liquid to PCM heat exchanger 71.

Referring to FIG. 18 and FIG. 19, the PCM heat exchanger 81 includes brick-like cells 82 containing a PCM.

The cells 82 include an open channel 83 such that when the cells 82 are stacked, closed channels 84 are formed between the cells 82 which a fluid can occupy and through which a fluid can circulate. The cells 82 can be constructed of a plastic material for example. In other embodiments, the cells 82 can be sealed plastic cells commonly used for ice packs. Channels 84 for fluid flow optimize heat transfer by facilitating an even distribution of fluid. In other embodiments of the present invention, the cells 82 can be vacuum sealed plastic with an external layer of corrugated material as the feature to create closed channels 84, and in still other embodiments, the corrugated material is corrugated plastic with various spaced holes throughout the corrugated surface to facilitate fluid flow around the cells 82.

In operation of the system 69 in a storage mode according to an embodiment of the present invention, source fluid circulates from the heat exchanger 71, through the source 70, back to the heat exchanger 71 before the cycle is repeated. In the present mode, the source 70 and pump 74 are operating while the thermal load 78 and the pump 75 are not running. The source 70 is either running in a heating mode or a cooling mode. The pump 74 draws fluid out of the heat exchanger 71 via the port 76 and circulates it through the source loop 72.

When the source 70 is operating in heating mode, the temperature of the source fluid is raised above the internal temperature of the heat exchanger 71. When the source 70 is operated in cooling mode, the temperature of the source fluid is lowered, below the internal temperature of the heat exchanger 71.

The source fluid which enters ports 76 or 77 of the heat exchanger 71 circulates around the cells 82 through the channels 84. When the source 70 is operating in heating mode, heat energy is transferred from the source fluid to the PCM 6 in the cells 82 to store heat potential in the PCM 6. When the source 70 is operating in cooling mode, heat energy is transferred from the PCM 6 in the cells 82 to the source fluid to store cooling potential in the PCM 6. The source fluid exits through the port opposite to the inlet.

In operation of the system 69 in a distribution mode according to an embodiment of the present invention, source fluid circulates from the heat exchanger 71, to the thermal load 78 and back to the heat exchanger 71 before the cycle is repeated. In the present mode, the pump 74 is off, while the pump 75 and the thermal load 78 are running. The pump 75 draws fluid out of the heat exchanger 71 via the port 77 and circulates it through the distribution loop 73 to the thermal load 78 and back to the heat exchanger 71 via port 76. If the PCM 6 in the cells 82 contains stored heat potential, the temperature of the source fluid will be raised and used for heating the thermal load 78. If the PCM 6 in the cells 82 contains stored cooling potential, the temperature of the source fluid will be lowered to cool the thermal load 78.

The system 69 in another embodiment of the present invention can be simultaneously operated in both storage mode and distribution mode. In this mode the pumps 74/75, the thermal load 78 and source 70 are all active.

The invention claimed is:

1. A radiator for selectively heating and cooling comprising:
    first and second spaced apart generally parallel headers, the first header for conducting a source fluid into the microchannel radiator and the second header for conducting a source fluid out of the radiator,
    a series of generally parallel pairs of microchannel tubes fluidly connecting the first and second headers, wherein
        a first spacing separating the microchannel tubes forming each of the pairs of microchannel tubes,
        a second spacing separating adjacent pairs of microchannel tubes, and,
        wherein the first spacings are narrower than the second spacings,
    fins located in the first spacings for conductively connecting the microchannel tubes forming each of the pairs, and
    a phase change material cell located in the second spacings,
    wherein the cell contacts the pair of microchannel tubes bounding the cell.

2. The radiator of claim 1, wherein the phase change material cells comprise a rigid plastic capsule containing a phase change material.

3. The radiator of claim 2, wherein the cells comprise chamfered edges for facilitating deformation of the cells for easier fitting into the second spacings.

4. The radiator of claim 2, wherein the cells further comprise a pull tab on the front face of the cell.

5. The radiator of claim 4, wherein the pull tab is sized so that it can be pulled by insertion of human fingers through an opening in the tab.

6. The radiator of claim 1, wherein the phase change material cells comprise a flexible plastic pouch containing a phase change material.

7. The radiator of claim 1, wherein one or more rigid plates connect to and support the microchannel tubes.

8. The radiator of claim 7, wherein one or more of the rigid plates have tabs bent out from the plate which help to align the phase change material cells during installation.

9. The radiator of claim 7 where one or more of the rigid plates have holes for the purpose of mounting the microchannel tubes.

10. The radiator of claim 1, wherein the microchannel tubes are parallel in a vertical or a horizontal series connected by adjacent parallel headers which are perpendicular to the microchannel tubes.

11. The radiator of claim 1, wherein the spacings range from about 0.25 cm to about 10 cm.

12. The radiator of claim 1, wherein phase change material cells and fins contact opposite faces of each microchannel tube in the series of tubes.

13. The system of claim 12 where a gap separates each phase change material capsule from the fins on the subsequent microchannel tube.

* * * * *